(12) United States Patent
Hughey et al.

(10) Patent No.: US 11,052,478 B2
(45) Date of Patent: Jul. 6, 2021

(54) METHOD FOR TAPPING AN ENGINE COMPONENT TO ORIENT A SPARK PLUG

(71) Applicant: Ford Motor Company, Dearborn, MI (US)

(72) Inventors: Ethan Timothy Hughey, Royal Oak, MI (US); Richard Earl Williford, Howell, MI (US); Shibu Mathew Philipose, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 332 days.

(21) Appl. No.: 15/971,666

(22) Filed: May 4, 2018

(65) Prior Publication Data
US 2019/0337067 A1   Nov. 7, 2019

(51) Int. Cl.
*B23G 1/18* (2006.01)
(52) U.S. Cl.
CPC .................. *B23G 1/18* (2013.01)
(58) Field of Classification Search
CPC .... B23G 1/18; B23G 1/00; B23G 1/44; F02F 1/242
See application file for complete search history.

(56) References Cited

U.S. PATENT DOCUMENTS

| | | | |
|---|---|---|---|
| 4,901,687 A | 2/1990 | Jones | |
| 8,054,460 B2 | 11/2011 | Agapiou et al. | |
| 8,407,891 B2 | 4/2013 | Owusu et al. | |
| 8,866,369 B2 | 10/2014 | Gfell et al. | |
| 9,322,630 B2 | 4/2016 | Wilkins et al. | |
| 2016/0303672 A1* | 10/2016 | Onley | B23G 7/00 |
| 2017/0141543 A1 | 5/2017 | Thomson et al. | |
| 2019/0337059 A1* | 11/2019 | Hughey | B23B 51/06 |
| 2019/0339053 A1* | 11/2019 | Hughey | G01B 5/012 |

FOREIGN PATENT DOCUMENTS

| | | |
|---|---|---|
| DE | 10349077 | 5/2005 |
| JP | 5691838 | 4/2015 |

OTHER PUBLICATIONS

Spencer, J., Getting the Most Out of Your Ignition: Spark Plug Indexing 101, enginelabs, Jul. 27, 2016, available at URL http://www.enginelabs.com/news/getting-the-most-out-of-your-ignition-spark-plug-indexing-101/.
Wang, Y., et al., Investigation of Impacts of Spark Plug Orientation on Early Flame Development and Combustion in a DI Optical Engine, Mar. 28, 2017, available at URL https://doi.org/10.4271/2017-01-0680.

\* cited by examiner

*Primary Examiner* — Rick K Chang
(74) *Attorney, Agent, or Firm* — Burris Law, PLLC

(57) ABSTRACT

A device and method of tapping an engine component to orient a spark plug includes measuring a tap pitch, measuring a first distance between a tap end surface and a full tap tooth center at a first rotational location, calculating a phantom first tap tooth based on the pitch and first distance, determining a tap rotational offset from the first location to a location where the end surface intersects the phantom first tooth, calculating a tap rotational starting orientation that is the first location minus the tap rotational offset minus a spark plug offset, rotating a tool head to the rotational starting orientation, positioning the tap so the end surface is a pitch incremental distance away from the engine component, synchronizing a rotating speed of the tool head and a feed rate to the tap thread pitch, and operating the tool to cut or form threads in the engine component.

20 Claims, 6 Drawing Sheets

METHOD FOR TAPPING AN ENGINE COMPONENT TO ORIENT A SPARK PLUG

FIELD

The present disclosure relates to a method and device for tapping an engine component to orient a spark plug.

BACKGROUND

The statements in this section merely provide background information related to the present disclosure and may not constitute prior art.

Spark plugs for internal combustion engines typically include a ground strap that is spaced apart from a central electrode to form the spark plug gap. Controlled electrical arcing across the gap typically provides the ignition spark to ignite compressed air fuel mixture within the combustion chamber. The ground strap is typically connected to one side of the main body of the spark plug. The orientation of the ground strap relative to the intake and exhaust valves of the engine can change the performance (e.g., fuel economy) of the engine by altering the flow patterns of the air-fuel mixture and combustion gasses in the combustion chamber.

Consistently orienting the ground strap in a predetermined and desired rotational location relative to the valves can improve consistency between the performance of different engines during production. The orientation of the ground strap typically depends on the characteristics of the internal threads of the engine cylinder head and the external threads of the spark plug. However, standard thread tapping machines use tapered tap bits that are unable to predictably orient the internal threads of the engine cylinder head. To get around this limitation, some engine cylinder heads have threads formed by a thread milling operation that includes a milling bit with a single cutting face that is rotated in a helical fashion about the internal diameter of the bore to form the threads. However, compared to standard thread tapping, thread milling can be a slow and expensive process and can be prone to tool wear or breakage due to the horizontal forces on the helically moving bit. Attempts at using standard thread tapping bits typically involve some process of trial and error such as forming a first, test part then adjusting settings so that subsequent parts are properly oriented. However, such trial and error methods are slow and result in wasted parts and additional tool wear.

The threading device and method of the present disclosure overcome these limitations of the typical spark plug tapping processes and can provide a properly oriented spark plug in a first part while using a durable and fast standard thread tap.

SUMMARY

In one form, a method of tapping an engine component to orient a spark plug in a combustion chamber of an internal combustion engine includes mounting a tap to a tool head of a tool and measuring a thread pitch of the tap. The method includes measuring a first distance between an end surface of the tap and a center of a predetermined full tooth of the tap, the first distance being measured at a first rotational location of the tap. The method includes calculating a phantom first tooth of the tap based on the thread pitch and the first distance. The method includes determining a tap rotational offset from the first rotational location to a rotational location where the end surface of the tap intersects the phantom first tooth of the tap at a major diameter of the phantom first tooth of the tap. The method includes determining a spark plug offset. The method includes calculating a tap rotational starting orientation, the tap rotational starting orientation being equal to the first rotational location minus the tap rotational offset minus the spark plug offset. The method includes rotating the tool head to the rotational starting orientation. The method includes positioning the tap so that the end surface of the tap is a pitch incremental distance of the tap away from the engine component. The method includes synchronizing a rotating speed of the tool head and a feed rate of the engine component relative to the tool head to the thread pitch of the tap and operating the tool to cut or form threads in the engine component.

According to a further form, the method further includes calculating a mathematical construct of teeth extending from the predetermined full tooth of the tap to the end surface of the tap based on the thread pitch of the tap and the first distance, the mathematical construct of teeth including the phantom first tooth.

According to a further form, determining the spark plug offset includes measuring parameters of a spark plug and calculating the spark plug offset based on the parameters of the spark plug.

According to a further form, determining the spark plug offset includes measuring a thread pitch of the spark plug, measuring a second distance between an end surface of the spark plug and a center of a predetermined tooth of the spark plug, the second distance being measured at a second rotational location of the spark plug, measuring a third distance between the end surface of the spark plug and a seat of the spark plug, calculating a phantom first tooth of the spark plug based on the thread pitch of the spark plug and the second distance, and calculating the spark plug offset based on the phantom first tooth of the spark plug, the third distance, and the second rotational location.

According to a further form, the tap has threads that are chamfered toward to the end surface of the tap.

According to a further form, the tap includes a plurality of partial threads proximate to the end surface of the tap.

According to a further form, the thread pitch of the tap and the first distance are measured using a laser tool setting gage or a shadow gage.

In another form, a method of tapping an engine component to orient a spark plug in a combustion chamber of an internal combustion engine includes mounting a tap to a tool head of a tool and measuring a thread pitch of the tap. The method includes measuring a first distance between an end surface of the tap and a center of a predetermined tooth of the tap, the first distance being measured at a first rotational location of the tap. The method includes calculating a tap rotation overshoot, the tap rotation overshoot being equal to the first distance divided by the thread pitch of the tap. The method includes calculating a tap rotational offset, the tap rotational offset being equal to the tap rotation overshoot minus a maximum integer value of the tap rotation overshoot, then multiplied by 360°. The method includes determining a spark plug offset. The method includes calculating a tap rotational starting orientation, the tap rotational starting orientation being based on the first rotational location, the tap rotational offset, and the spark plug offset. The method includes rotating the tool head to the tap rotational starting orientation. The method includes positioning the tap so that the end surface of the tap is a pitch incremental distance of the tap away from the engine component. The method includes synchronizing a rotating speed of the tool head and a feed rate of the engine component relative to the tool head to the thread pitch of the tap and operating the tool to cut threads in the engine component.

According to a further form, determining the spark plug offset includes measuring parameters of a spark plug and calculating the spark plug offset based on the parameters of the spark plug.

According to a further form, determining the spark plug offset includes measuring a thread pitch of the spark plug, measuring a second distance between an end surface of the spark plug and a center of a predetermined tooth of the spark plug, the second distance being measured at a second rotational location of the spark plug, measuring a third rotational location, the third rotational location being the rotational offset from the second rotational location to a ground strap of the spark plug, measuring a third distance between the end surface of the spark plug and a seat of the spark plug, calculating a spark plug rotation overshoot, the spark plug rotation overshoot being equal to the second distance divided by the thread pitch of the spark plug, calculating a spark plug rotational offset, the spark plug rotational offset being equal to the spark plug rotation overshoot minus a maximum integer value of the spark plug rotation overshoot, then multiplied by 360°, calculating a number of rotations to seat the spark plug, the number of rotations to seat the spark plug being equal to the third distance divided by the thread pitch of the spark plug, calculating a spark plug reference finish position, the spark plug reference finish position being equal to the number of rotations to seat the spark plug minus a maximum integer value of the number of rotations to seat the spark plug, then multiplied by 360°, calculating a finished electrode offset, the electrode offset being equal to the spark plug rotational offset plus the spark plug reference finish position, and calculating the spark plug offset, the spark plug offset being equal to the third rotational offset minus the finished electrode offset minus the second rotational position.

According to a further form, the third rotational offset is equal to 0°.

According to a further form, the tap has threads that are chamfered toward to the end surface of the tap.

According to a further form, the tap includes a plurality of partial threads proximate to the end surface of the tap.

According to a further form, the predetermined tooth is a full tooth.

According to a further form, the thread pitch of the tap and the first distance are measured using a laser tool setting gage or a shadow gage.

According to a further form, the tap rotational starting orientation is equal to an adjustment factor plus the first rotational location minus the tap rotational offset minus the spark plug offset.

According to a further form, the adjustment factor is either 0° or a positive or negative whole number multiple of 360° configured so that the tap rotational starting orientation is within the range of 0°-360°.

In another form, a threading device includes a tool, a tap, at least one sensor, and a control module. The tool includes a chuck configured to rotate about an axis. The tap is coupled to the chuck for common rotation about the axis. The at least one sensor is configured to detect a thread pitch of the tap and a first distance between an end surface of the tap and a center of a predetermined full tooth of the tap. The first distance is measured at a first rotational location of the tap. The control module is in communication with the at least one sensor and the tool. The control module is configured to calculate a location of a phantom first tooth based on the thread pitch of the tap and the first distance. The end surface intersects the phantom first tooth at a major diameter of the phantom first tooth. The control module is configured to calculate a tap rotational starting orientation based on the first rotational location, the location of the phantom first tooth, and a spark plug offset. The control module is in communication with the tool and configured to synchronize a rotating speed of the chuck and a feed rate of the engine component relative to the chuck to the thread pitch of the tap to cut or form threads in the engine component based on the tap rotational starting orientation.

According to a further form, the control module is configured to control an axial position of the tap relative to the engine component based on an input representative of an overall length of the tap and the first rotational location.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
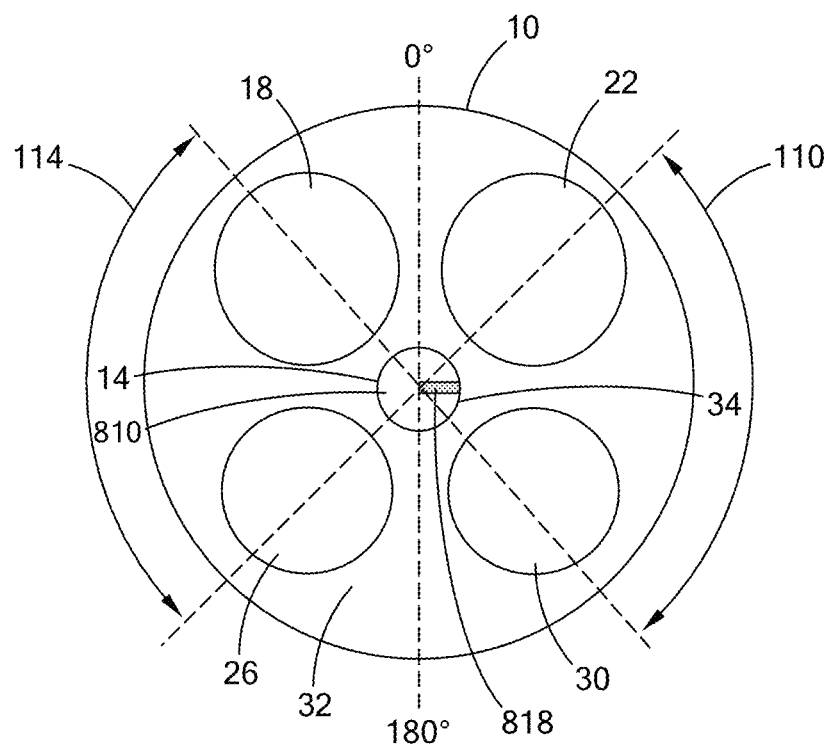
FIG. 1 is a bottom plan view of a portion of an engine cylinder head and spark plug in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a portion of an internal combustion engine is illustrated. The engine includes a cylinder head 10, a spark plug 14, a pair of intake valves 18, 22 and a pair of exhaust valves 26, 30 that form a top of a combustion chamber 32 of the engine. The intake valves 18, 22 are adjacent to each other and disposed on one side of the combustion chamber 32, while the exhaust valves 26, 30 are adjacent to each other and disposed on the opposite side of the combustion chamber 32. In the example provided, the cylinder head 10 includes a threaded bore 34 that is approximately in the center of the combustion chamber 32 and the spark plug 14 is threaded into the bore 34. The spark plug 14 includes a main body 810, an electrode 814 (shown in FIG. 8), and a ground strap 818. The main body 810 is threaded to be threadably received in the bore 34. The electrode 814 is disposed at a center of the main body 810 and within the combustion chamber 32 when the main body 810 is threaded into the bore 34. The ground strap 818 is attached to a side of the main body 810 and extends radially inward to overlap the electrode 814. The electrode 814 and ground strap 818 are spaced apart to define a spark gap within the combustion chamber 32.

In the example provided, a 0° axis is defined as equally between the intake valves 18, 22 and the ground strap 818 is shown oriented at a 90° orientation so that it is perpendicular to the 0° axis. It has been found that orienting the ground strap 818 within the angular regions denoted by reference numeral 110 or 114 (e.g., approximately 41°-139° or 221°-319°) can result in improved flow dynamics within the combustion chamber 32 when compared to other orientations since the ground strap 818 interferes less with the intake and exhaust flow of the gasses in the combustion chamber 32.

Figure 2:
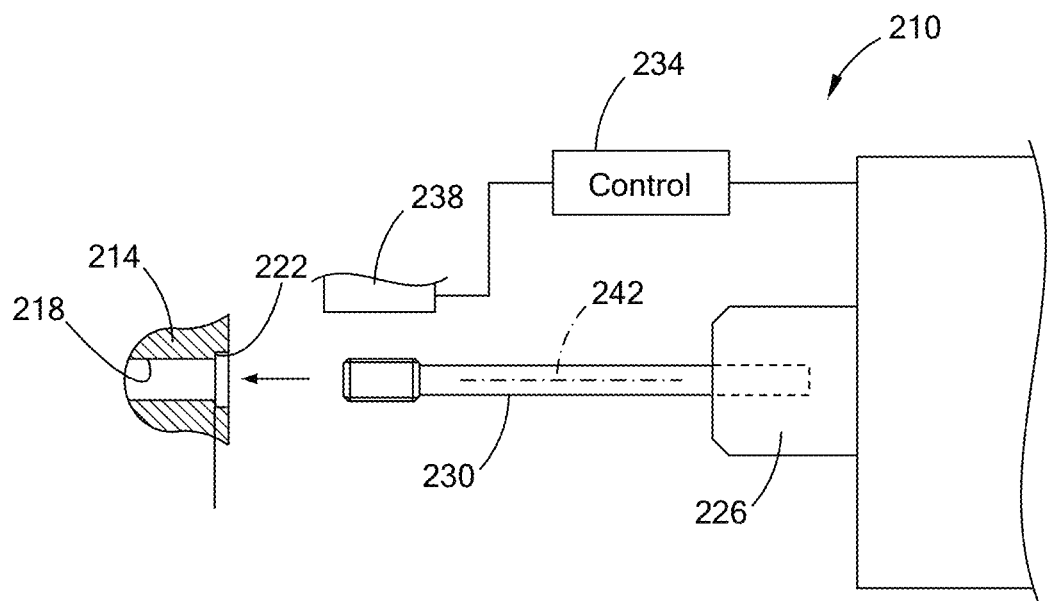
FIG. 2 is a side view of a portion of a thread tapping tool in accordance with the teachings of the present disclosure, illustrating the thread tapping tool and a portion of an engine cylinder head.

With reference to FIG. 2, a thread tapping device 210 is illustrated with a portion of a cylinder head 214. The cylinder head 214 includes a bore 218 similar to the bore 34 (FIG. 1), except internal threads have not yet been formed in the bore 218 to receive the spark plug 14 (FIG. 1). In the example provided, the bore 218 is counter-bored to define a shoulder 222 on which the spark plug 14 seats. The thread tapping device 210 includes a tool head or chuck 226, a thread tapping bit 230, a control module 234, and a sensor 238. While illustrated and described herein as a single sensor, the sensor 238 can include a plurality of sensors that work independently or together to measure the characteristics described herein.

The chuck 226 is mounted for rotation about a tool axis 242. The chuck 226 is configured to hold the thread tapping bit 230 so that the thread tapping bit 230 is disposed coaxially with the tool axis 242 and rotates with the chuck 226 about the tool axis 242. The sensor 238 is offset from the tool axis 242 and spaced apart from the thread tapping bit 230. The sensor 238 is in communication with the control module 234 and the control module 234 is configured to control operation of the sensor 238 and receive signals from the sensor 238. The sensor 238 can be any suitable type of sensor configured to detect an orientation of the thread tapping bit 230 (e.g. a shadow profile gage or a laser gage), and is described in greater detail below.

The control module 234 is configured to control rotational position of the chuck 226 and axial position of the chuck 226 relative to the engine component (i.e., the cylinder head 214). In the example provided, the control module 234 is configured to align the tool axis 242 coaxially with the bore 218 and rotate the thread tapping bit 230 about the tool axis 242 while moving the thread tapping bit toward the cylinder head 214 and into the bore 218 at a rate that is synchronized to the rotation of the thread tapping bit 230 in order to form internal threads within the bore 218. The process of forming the threads is described in greater detail below. In an alternative configuration, the axial position of the thread tapping bit 230 can be stationary while the cylinder head 214 is moved axially relative to the rotating thread tapping bit 230.

Figure 3:
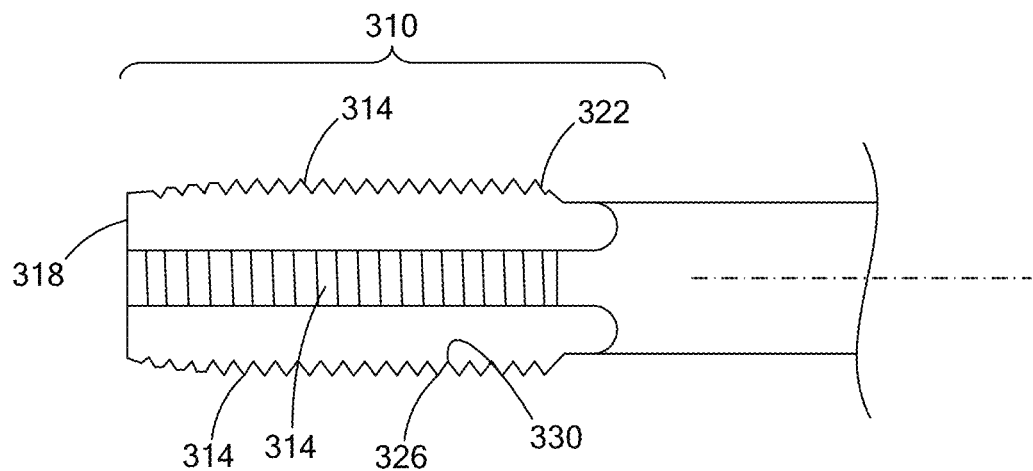
FIG. 3 is a side view of a thread tapping bit of the thread tapping tool of FIG. 2.
Figure 4:
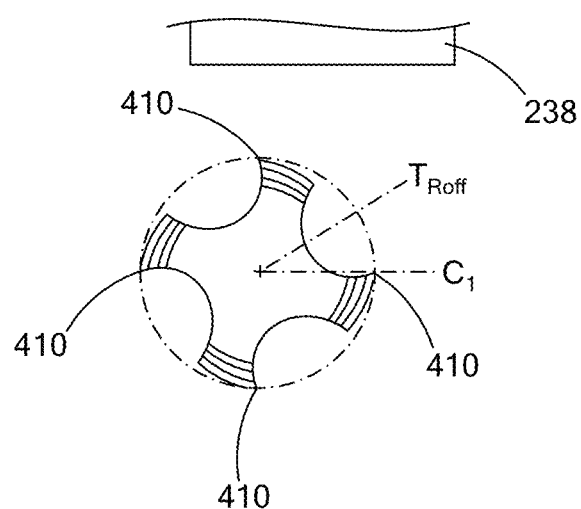
FIG. 4 is a top view of the thread tapping bit of FIG. 3, illustrating a sensor of the thread tapping tool of FIG. 2.

With additional reference to FIGS. 3 and 4, an end 310 of the threaded tapping bit 230 includes a plurality of cutting sections 314 equally spaced about the tool axis 242 in the circumferential direction. The cutting sections 314 extend axially a predetermined distance from a terminal end face 318 of the threaded tapping bit 230. The cutting sections 314 include a plurality of teeth 322 configured to form internal threads having a major diameter (i.e., at peaks 326 of the teeth 322) and a minor diameter (i.e., at valleys 330 of the teeth 322). The cutting sections 314 are chamfered or tapered toward the end face 318 so that the teeth 322 proximate to the end face 318 are not full teeth 322 (i.e., they have plateaus instead of the peaks 326 and do not extend radially outward to the full major diameter). The teeth 322 are tapered such that a region of the cutting sections 314 that is distal to the end face 318 includes full ones of the teeth 322. Each cutting section 314 includes a leading edge 410 that is configured to engage the engine component to remove material and form the threads in the bore 218.

Figure 5:
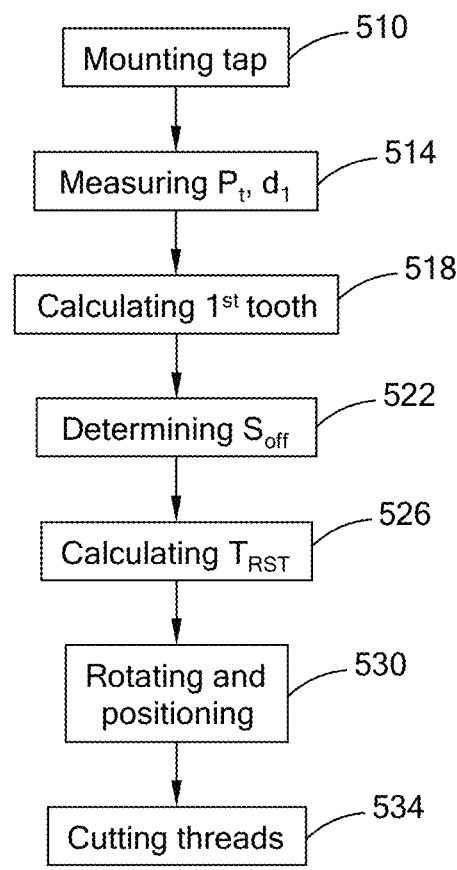
FIG. 5 is a flow chart of a method of tapping the cylinder head of FIG. 2.

With additional reference to FIG. 5, a method of tapping the bore 218 (FIG. 2) is illustrated in flow chart form. The method can start at step 510. At step 510, the tapping bit 230 is mounted into the chuck 226 so that the tapping bit 230 is axially and rotationally stationary relative to the chuck 226. The method can then proceed to step 514.

At step 514, the sensor 238 measures the thread teeth 322 of the tapping bit 230 and send signals to the control module 234 representative of the measured values. With continued reference to FIG. 5 and additional reference to FIG. 6, the sensor 238 of the example provided includes a shadow gage configured to scan or detect a profile (shown in solid lines in FIG. 6) of the teeth 322 of one of the cutting sections 314. Based on input from the sensor 238, the control module 234 measures a thread pitch ($P_t$) of the tapping bit 230, the thread pitch ($P_t$) being the axial distance between two adjacent peaks 326 of the thread teeth 322. In the example provided, the sensor 238 and control module 234 measure the thread pitch ($P_t$) by measuring the axial distance between the peaks 326 of any two adjacent full teeth 322.

Figure 6:
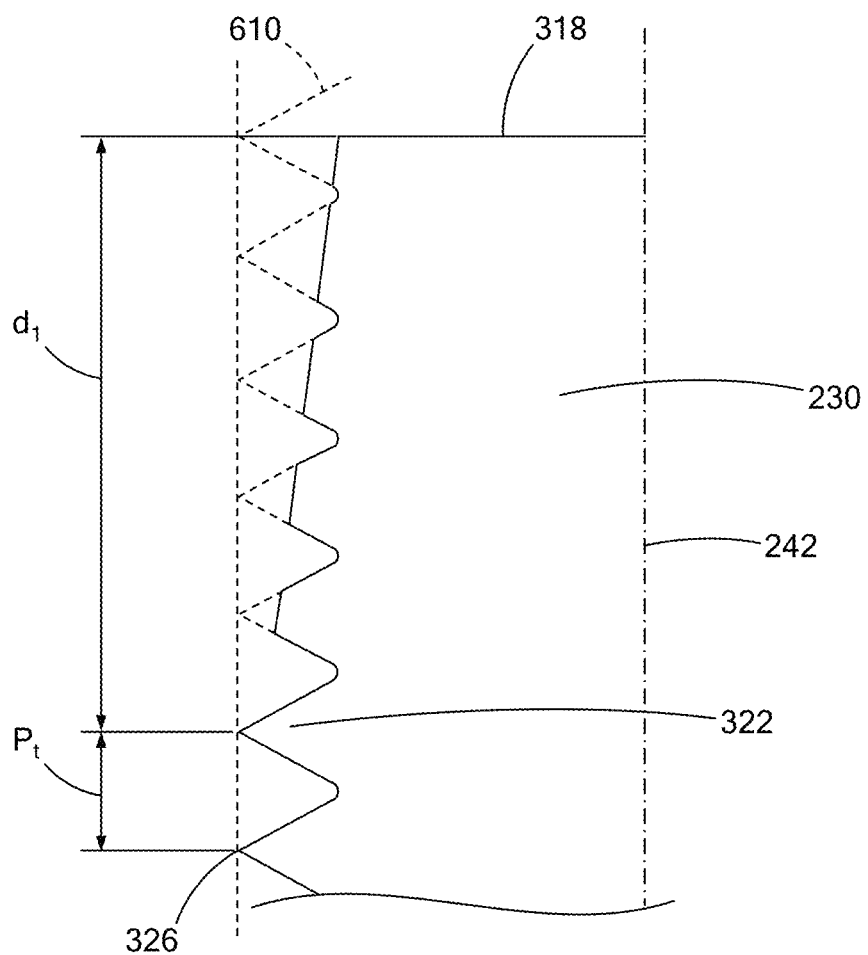
FIG. 6 is a side profile view of a portion of the thread tapping bit of FIG. 3, illustrating a calculated phantom first tooth.

The sensor 238 and control module 234 also measure a first distance ($d_1$), the first distance ($d_1$) being the axial distance between the end face 318 and the peak 326 of any one of the full teeth 322. While the first distance ($d_1$) is shown in FIG. 6 as the distance to the first one of the full teeth 322, the first distance ($d_1$) can be the distance to any one of the full teeth 322. The first distance ($d_1$) is measured at a first rotational location ($C_1$) (shown in FIG. 4) of the taping bit 230. The value of the first rotational location ($C_1$), the first distance ($d_1$), and the thread pitch ($P_t$) of the tapping bit 230 can be stored in memory of the control module 234 and the method can proceed to step 518.

At step 518, the control module 234 can calculate a mathematical construct of the teeth 322 (i.e., an interpolation of the threads about the tapping bit 230 until the end face 318) and calculates a phantom first tooth 610 that is the tooth of the tapping bit 230 that would have its peak 326 axially aligned with the end face 318 if that tooth was not tapered or physically existed. This phantom first tooth 610 can be along one of the cutting sections 314, or can be located rotationally between the cutting sections 314. To calculate the phantom first tooth 610, the control module 234 calculates a tap rotational overshoot ($T_{Rov}$) as being equal to the first distance ($d_1$) divided by the thread pitch ($P_t$) of the teeth 322.

In other words: $T_{Rov}=d_1/P_t$

The control module 234 then calculates a tap rotational offset ($T_{Roff}$) based on the tap rotational overshoot ($T_{Rov}$). The tap rotational offset ($T_{Roff}$) can be equal to the tap rotation overshoot ($T_{Rov}$) minus a maximum integer value ($T_{Rov\_int}$) of the tap rotation overshoot ($T_{Rov}$), then multiplied by 360°. The tap rotational offset ($T_{Roff}$) is the rotational offset from the first rotational location ($C_1$) to the rotational location of the phantom first tooth 610. One example of this location of the tap rotational offset ($T_{Roff}$) is indicated on FIG. 4 by axis ($T_{Roff}$), though the actual rotational angle relative to the first rotational location ($C_1$) can be different depending on the orientation of the teeth 322 and the location of the measurements taken. Thus, the location of the axis ($T_{Roff}$) in FIG. 4 is merely for ease of illustration.

In other words: $(T_{Roff}=(T_{Rov}-T_{Rov\_int})*360°)$

After determining the tap rotational offset ($T_{Roff}$), the method can proceed to step 522, where the control module 234 can then determine a spark plug offset ($S_{off}$). The spark plug offset ($S_{off}$) is described in greater detail below, but is generally a characteristic of the spark plug to be inserted into the threaded bore and is related to the location of the ground strap 818 (FIG. 1), the threads of the spark plug 14, and the seating depth of the spark plug 14. In one configuration, the spark plug offset ($S_{off}$) is a value previously stored in and now retrieved from memory of the control module 234. For example, the spark plug offset ($S_{off}$) value can be specified to the manufacturer of the spark plug 14 and the spark plug 14 can be manufactured within specified tolerances of the spark plug offset. In one example, the spark plug 14 can be configured so that its spark plug offset ($S_{off}$) value is zero, though other values can be used.

Alternatively, the spark plug offset ($S_{off}$) value can be determined by measuring characteristics of each spark plug 14. This can be done when with any spark plug 14, such as ones where the spark plug offset is not specified to the manufacturer. This allows the thread tapping device 210 (FIG. 2) to tap the bore 218 (FIG. 2) in a tailored fashion for each individual spark plug to ensure proper orientation of each spark plug. Alternatively, it can be done as a way of checking to see if the spark plug offset is within tolerances specified on spark plugs where the spark plug offset is specified in manufacturing.

Figure 7:
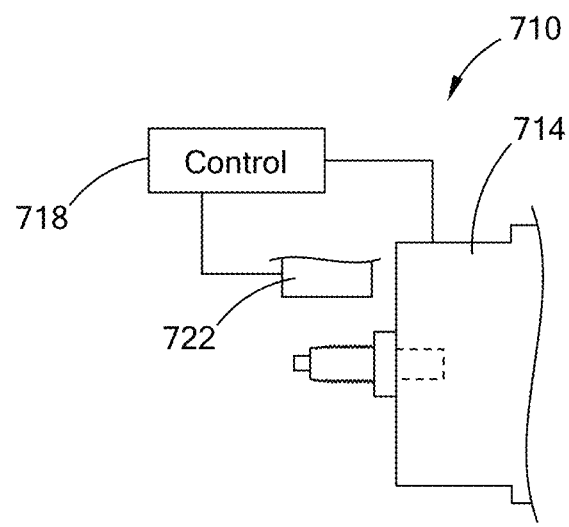
FIG. 7 is a side view of a spark plug measuring tool in accordance with the teachings of the present disclosure, illustrating a chuck of the measuring tool holding a spark plug.
Figure 10:
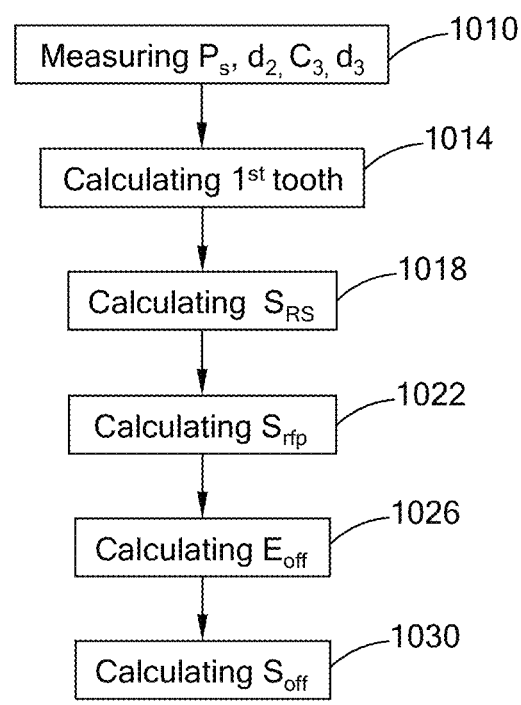
FIG. 10 is a flow chart of a method of determining a spark plug rotational offset for use in the method of FIG. 5, in accordance with the teachings of the present disclosure.

With additional reference to FIGS. 7 and 10, the process of determining the spark plug offset ($S_{off}$) can begin at step 1010 and the characteristics can be determined by a measuring device 710. The measuring device 710 can be separate from the thread tapping device 210 (FIG. 2) or the same device may be used to measure the spark plug 14 and the tapping bit 230. In the example provided, the measuring device 710 includes a chuck 714, a control module 718, and a sensor 722. In the configuration where the measuring device 710 and the thread tapping device 210 are separate devices, they can share a common control module, or their respective control modules can be in communication with each other, or a user can record the spark plug offset ($S_{off}$) that is output by the measuring device 710 and enter that value into the thread tapping device 210.

At step 1010, the spark plug 14 is held by the chuck 714 and the sensor 722 measures characteristics of the spark plug 14. The sensor 722 can be similar to the sensor 238 (FIGS. 2 and 4). With additional reference to FIG. 8, based on input from the sensor 722, the control module 718 measures a thread pitch ($P_s$) of the spark plug 14 the thread pitch ($P_s$) being the axial distance between two adjacent peaks 822 of thread teeth 824 of the spark plug 14. In the example provided, the sensor 722 and control module 718 measure the thread pitch ($P_s$) by measuring the axial distance between the peaks 822 of any two adjacent full teeth 824.

Figure 8:
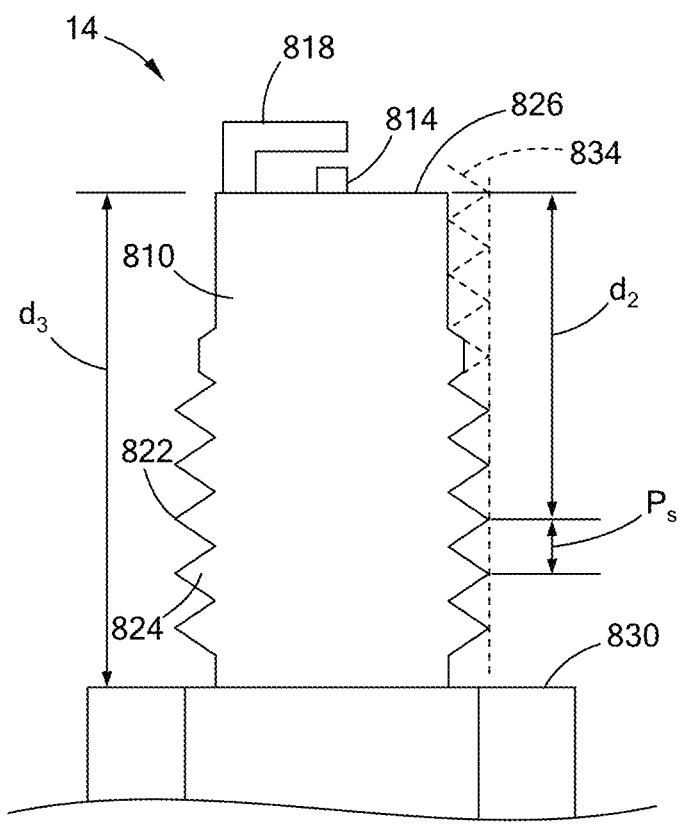
FIG. 8 is a side profile view of a portion of the spark plug of FIG. 7, illustrating a calculated phantom first tooth.

The sensor 722 and control module 718 also measure a second distance ($d_2$), the second distance ($d_2$) being the axial distance between an end face 826 of the spark plug 14 and the peak 822 of any one of the full teeth 824. While the second distance ($d_2$) is shown in FIG. 8 as the distance to the second one of the full teeth 824, the second distance ($d_2$) can be the distance to any one of the full teeth 824. The second distance ($d_2$) is measured at a second rotational location ($C_2$) (shown in FIG. 9) of the spark plug 14. The sensor 722 and control module 718 also measure a third rotational location ($C_3$) (shown in FIG. 9) that is the rotational offset from the second rotational location ($C_2$) to the ground strap 818 of the spark plug 14. In the example shown in FIG. 9, the third rotational location is 180°, though this value will depend on the orientation of the ground strap 818 relative to the location where the second distance ($d_2$) measurement is taken. The sensor 722 and control module 718 also measure a third distance ($d_3$) that is the distance between the end face 826 of the spark plug 14 and a seat face 830 of the spark plug 14. The seat face 830 is the surface that seats against the shoulder 222 of the bore 218 (FIG. 2). The values of the second rotational location ($C_2$), the second distance ($d_2$), the third rotational location ($C_3$), and the thread pitch ($P_t$) of the tapping bit 230 can be stored in memory of the control module 718 and the method can proceed to step 1014.

In the example provided, the teeth 824 of the spark plug 14 do not extend axially to the end face 826 and terminate at a location axially spaced apart from the end face 826. At step 1014, the control module 718 can calculate a mathematical construct of the teeth 824 (i.e., an interpolation of the threads about the spark plug 14 until the end face 826) and calculates a phantom first tooth 834 that is the tooth that would have its peak 822 axially aligned with the end face 826 if that tooth physically existed. This phantom first tooth 834 can be located rotationally anywhere about the circumference of the spark plug, and is only shown aligned with the measurement of the second distance ($d_2$) in FIG. 8 for ease of illustration. To calculate the phantom first tooth 834, the control module 718 calculates a spark plug rotation overshoot ($S_{Rov}$) as being equal to the second distance ($d_2$) divided by the thread pitch ($P_s$) of the spark plug.

In other words: $S_{Rov}=d_2/P_s$

Figure 9:
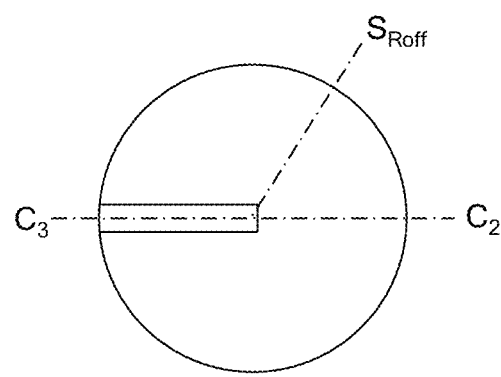
FIG. 9 is a bottom view of the spark plug of FIG. 7.

The control module 718 then calculates a spark plug rotational offset ($S_{Roff}$) based on the spark plug rotational overshoot ($S_{Rov}$). The spark plug rotational offset can be equal to the spark plug rotation overshoot ($S_{Rov}$) minus a maximum integer value ($S_{Rov\_int}$) of the spark plug rotation overshoot ($S_{Rov}$), then multiplied by 360°. The spark plug rotational offset ($S_{Roff}$) is the rotational offset from the second rotational location ($C_2$) to the rotational location of the first phantom tooth 834. One example of this location of the spark plug rotational offset ($S_{Roff}$) is indicated on FIG. 9 by axis ($S_{Roff}$), though the actual rotational angle relative to the second rotational location ($C_2$) can be different depending on the orientation of the teeth 824 and the location of the measurements taken. Thus, the location of the axis ($C_3$) in FIG. 9 is merely for ease of illustration.

In other words: $S_{Roff}=(S_{Rov}-S_{Rov\_int})*360°$

After determining the spark plug rotational offset ($S_{Roff}$), the method can proceed to step 1018 where the control module 718 calculates a number of rotations ($S_{Rs}$) needed to seat the spark plug seat surface 830 on the shoulder 222 (FIG. 2). The number of rotations ($S_{Rs}$) needed to seat the spark plug seat surface 830 on the shoulder 222 (FIG. 2) is equal to the third distance ($d_3$) divided by the thread pitch ($P_s$) of the spark plug 14.

In other words: $S_{Rs}=d_3/P_s$

After determining the number of rotations ($S_{Rs}$) needed to seat the spark plug 14, the method can proceed to step 1022 where the control module 718 calculates a spark plug reference finish position ($S_{rfp}$) based on the number of rotations ($S_{Rs}$). The spark plug reference finish position ($S_{rfp}$) can be equal to the number of rotations ($S_{Rs}$) to seat the spark plug 14 minus a maximum integer value ($S_{Rs\_int}$) of the number of rotations ($S_{Rs}$) to seat the spark plug 14, then multiplied by 360°.

In other words: $S_{rfp}=(S_{Rs}-S_{Rs\_int})*360°$

After determining the spark plug reference finish position ($S_{rfp}$), the method can proceed to step 1026 where the control module 718 calculates a finished electrode offset ($E_{off}$) based on the spark plug reference finish position ($S_{rfp}$) and the spark plug rotational offset ($S_{Roff}$). The finished electrode offset ($E_{off}$) is equal to the spark plug rotational offset ($S_{Roff}$) plus the spark plug reference finish position ($S_{rfp}$).

In other words: $E_{off}=S_{Roff}+S_{rfp}$

After determining the finished electrode offset ($E_{off}$), the method can proceed to step 1030 where the control module 718 calculates the spark plug offset ($S_{off}$) based on the second rotational location ($C_2$), the third rotational location ($C_3$), and the finished electrode offset ($E_{off}$). The spark plug offset ($S_{off}$) can be equal to the third rotational offset ($C_3$) minus the finished electrode offset ($E_{off}$) minus the second rotational position ($C_2$).

In other words: $S_{off}=C_3-E_{off}-C_2$

Returning to FIGS. 2 and 5, and with the spark plug offset determined, the method of tapping the bore 218 can proceed to step 526. At step 526, the control module 234 calculates a tap rotational starting orientation ($T_{Rst}$). The tap rotational starting orientation ($T_{Rst}$) is based on the first rotational location ($C_1$), the tap rotational offset ($T_{Roff}$), and the spark plug offset ($S_{Soff}$). The tap rotational starting orientation ($T_{Rst}$) can be equal to an adjustment factor ($A_F$) plus the first rotational location ($C_1$) minus the tap rotational offset ($T_{Roff}$) minus the spark plug offset ($S_{off}$). The adjustment factor ($A_F$) can be either 0° or a positive or negative whole number multiple of 360° configured so that the tap rotational starting orientation ($R_{st}$) ends up within the range of 0°-360°.

In other words: $R_{st}=C_1-T_{Roff}-S_{off}+A_F$

For example, if $[C_1-T_{Roff}-S_{off}>360°]$, then $A_F$ can be negative 360°. If $[C_1-T_{Roff}-S_{off}<0°]$, then $A_F$ can be positive 360°. If $[0°\le C_1-T_{Roff}-S_{off}\le 360°]$, then $A_F$ can be 0°. This adjustment factor (AF) can be used so that the thread tapping device 210 need only rotate the tapping bit 230 within the range of 0°-360° to properly orient it before tapping. Alternatively, the thread tapping device 210 can be configured to rotate the tapping bit 230 in a negative rotational direction or greater than 360° during the orientation of the tapping bit 230 and the adjustment factor can be not used or 0° despite $[360°\le C_1-T_{Roff}-S_{off}\le 0°]$.

After the tap rotational starting orientation ($R_{st}$) is determined, the method can proceed to step 530 where the control module 234 rotates the tapping bit 230 so that it is rotated to the tap rotational starting orientation ($R_{st}$). The control module 234 also positions the tapping bit 230 so that the end face 318 of the tapping bit 230 is a pitch incremental distance away from the bore 218, the pitch incremental distance being equal to a whole number multiple of the thread pitch ($P_t$) of the tapping bit 230. With the tapping bit 230 oriented relative to the bore 218, the method can proceed to step 534.

At step 534, the thread tapping device 210 synchronizes a rotating speed of the tapping bit 230 and an axial feed rate of the tapping bit 230 toward the bore 218 to the thread pitch ($P_t$) of the tapping bit 230 and continues to rotate and move the tapping bit 230 to cut internal threads in the bore 218.

Forming the internal threads using the above described device and method ensures the desired orientation of the ground strap 818 for each spark plug 14 when the spark plug 14 is threaded into and seated in the cylinder head 10.

While the steps of the methods discussed above are discussed in a particular order using terms like "after", it is understood that certain calculations can be done simultaneously or in different orders than that specifically described above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass tranistory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskel, Go, SQL, R, Lisp, Java®, Fortran, Perl, Pascal, Curl, OCaml, Javascript®, HTML5, Ada, Asp (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A method of tapping an engine component to orient a spark plug in a combustion chamber of an internal combustion engine, the method comprising:
    mounting a tap to a tool head of a tool;
    measuring a thread pitch of the tap;
    measuring a first distance between an end surface of the tap and a center of a predetermined full tooth of the tap, the first distance being measured at a first rotational location of the tap;
    calculating a phantom first tooth of the tap based on the thread pitch and the first distance;
    determining a tap rotational offset from the first rotational location to a rotational location where the end surface of the tap intersects the phantom first tooth of the tap at a major diameter of the phantom first tooth of the tap;
    determining a spark plug offset;
    calculating a tap rotational starting orientation, the tap rotational starting orientation being equal to an adjustment factor plus the first rotational location minus the tap rotational offset minus the spark plug offset;
    rotating the tool head to the rotational starting orientation;
    positioning the tap so that the end surface of the tap is a pitch incremental distance of the tap away from the engine component; and
    synchronizing a rotating speed of the tool head and a feed rate of the engine component relative to the tool head to the thread pitch of the tap and operating the tool to cut or form threads in the engine component.

2. The method of claim 1, further comprising:
    calculating a mathematical construct of teeth extending from the predetermined full tooth of the tap to the end surface of the tap based on the thread pitch of the tap and the first distance, the mathematical construct of teeth including the phantom first tooth.

3. The method of claim 1, wherein determining the spark plug offset includes measuring parameters of a spark plug and calculating the spark plug offset based on the parameters of the spark plug.

4. The method of claim 1, wherein determining the spark plug offset includes:
    measuring a thread pitch of the spark plug;
    measuring a second distance between an end surface of the spark plug and a center of a predetermined tooth of the spark plug, the second distance being measured at a second rotational location of the spark plug;
    measuring a third distance between the end surface of the spark plug and a seat of the spark plug;
    calculating a phantom first tooth of the spark plug based on the thread pitch of the spark plug and the second distance; and
    calculating the spark plug offset based on the phantom first tooth of the spark plug, the third distance, and the second rotational location.

5. The method of claim 1, wherein the tap has threads that are chamfered toward to the end surface of the tap.

6. The method of claim 1, wherein the tap includes a plurality of partial threads proximate to the end surface of the tap.

7. The method of claim 1, wherein the thread pitch of the tap and the first distance are measured using a laser tool setting gage or a shadow gage.

8. The method of claim 1, wherein calculating the phantom first tooth includes calculating a tap rotational overshoot, the tap rotational overshoot being equal to the first distance divided by the thread pitch of the tap.

9. The method of claim 8, wherein the tap rotational offset is equal to the tap rotation overshoot minus a maximum integer value of the tap rotation overshoot, then multiplied by 360°.

10. The method of claim 1, wherein determining the spark plug offset includes:
    measuring a thread pitch of the spark plug;
    measuring a second distance between an end surface of the spark plug and a center of a predetermined tooth of the spark plug, the second distance being measured at a second rotational location of the spark plug;
    measuring a third rotational location, the third rotational location being a rotational offset from the second rotational location to a ground strap of the spark plug;
    measuring a third distance between the end surface of the spark plug and a seat of the spark plug;

calculating a spark plug rotation overshoot, the spark plug rotation overshoot being equal to the second distance divided by the thread pitch of the spark plug;

calculating a spark plug rotational offset, the spark plug rotational offset being equal to the spark plug rotation overshoot minus a maximum integer value of the spark plug rotation overshoot, then multiplied by 360°;

calculating a number of rotations to seat the spark plug, the number of rotations to seat the spark plug being equal to the third distance divided by the thread pitch of the spark plug;

calculating a spark plug reference finish position, the spark plug reference finish position being equal to the number of rotations to seat the spark plug minus a maximum integer value of the number of rotations to seat the spark plug, then multiplied by 360°;

calculating a finished electrode offset, the electrode offset being equal to the spark plug rotational offset plus the spark plug reference finish position; and calculating the spark plug offset, the spark plug offset being equal to the third rotational offset minus the finished electrode offset minus the second rotational position.

11. The method of claim 10, wherein the third rotational offset is equal to 0°.

12. The method of claim 1, wherein the adjustment factor is either 0° or a positive or negative whole number multiple of 360° configured so that the tap rotational starting orientation is within the range of 0°-360°.

13. A method of tapping an engine component to orient a spark plug in a combustion chamber of an internal combustion engine, the method comprising:

mounting a tap to a tool head of a tool;

measuring a thread pitch of the tap;

measuring a first distance between an end surface of the tap and a center of a predetermined tooth of the tap, the first distance being measured at a first rotational location of the tap;

calculating a tap rotation overshoot, the tap rotation overshoot being equal to the first distance divided by the thread pitch of the tap;

calculating a tap rotational offset, the tap rotational offset being equal to the tap rotation overshoot minus a maximum integer value of the tap rotation overshoot, then multiplied by 360°;

determining a spark plug offset;

calculating a tap rotational starting orientation, the tap rotational starting orientation being based on the first rotational location, the tap rotational offset, and the spark plug offset;

rotating the tool head to the tap rotational starting orientation;

positioning the tap so that the end surface of the tap is a pitch incremental distance of the tap away from the engine component; and synchronizing a rotating speed of the tool head and a feed rate of the engine component relative to the tool head to the thread pitch of the tap and operating the tool to cut threads in the engine component.

14. The method of claim 13, wherein determining the spark plug offset includes measuring parameters of a spark plug and calculating the spark plug offset based on the parameters of the spark plug.

15. The method of claim 13, wherein determining the spark plug offset includes:

measuring a thread pitch of the spark plug;

measuring a second distance between an end surface of the spark plug and a center of a predetermined tooth of the spark plug, the second distance being measured at a second rotational location of the spark plug;

measuring a third rotational location, the third rotational location being the rotational offset from the second rotational location to a ground strap of the spark plug;

measuring a third distance between the end surface of the spark plug and a seat of the spark plug;

calculating a spark plug rotation overshoot, the spark plug rotation overshoot being equal to the second distance divided by the thread pitch of the spark plug;

calculating a spark plug rotational offset, the spark plug rotational offset being equal to the spark plug rotation overshoot minus a maximum integer value of the spark plug rotation overshoot, then multiplied by 360°;

calculating a number of rotations to seat the spark plug, the number of rotations to seat the spark plug being equal to the third distance divided by the thread pitch of the spark plug;

calculating a spark plug reference finish position, the spark plug reference finish position being equal to the number of rotations to seat the spark plug minus a maximum integer value of the number of rotations to seat the spark plug, then multiplied by 360°;

calculating a finished electrode offset, the electrode offset being equal to the spark plug rotational offset plus the spark plug reference finish position; and calculating the spark plug offset, the spark plug offset being equal to the third rotational offset minus the finished electrode offset minus the second rotational position.

16. The method of claim 15, wherein the third rotational offset is equal to 0°.

17. The method of claim 13, wherein the tap includes a plurality of partial threads proximate to the end surface of the tap.

18. The method of claim 17, wherein the predetermined tooth is a full tooth.

19. The method of claim 13, wherein the tap rotational starting orientation is equal to an adjustment factor plus the first rotational location minus the tap rotational offset minus the spark plug offset.

20. The method of claim 19, wherein the adjustment factor is either 0° or a positive or negative whole number multiple of 360° configured so that the tap rotational starting orientation is within the range of 0°-360°.

* * * * *